United States Patent
Schibsbye et al.

(10) Patent No.: US 11,305,462 B2
(45) Date of Patent: Apr. 19, 2022

(54) METHOD AND SYSTEM FOR MANUFACTURING A SHEAR WEB FOR A WIND TURBINE

(71) Applicant: LM WIND POWER US TECHNOLOGY APS, Kolding (DK)

(72) Inventors: Karsten Schibsbye, Fredericia (DK); Michael Larsen, Kolding (DK); Kristian Lehmann Madsen, Fredericia (DK)

(73) Assignee: LM WIND POWER US TECHNOLOGY APS, Kolding (DK)

(*) Notice: Subject to any disclaimer, the term of this patent is extended or adjusted under 35 U.S.C. 154(b) by 165 days.

(21) Appl. No.: 16/465,717

(22) PCT Filed: Dec. 1, 2017

(86) PCT No.: PCT/EP2017/081178
§ 371 (c)(1),
(2) Date: May 31, 2019

(87) PCT Pub. No.: WO2018/100152
PCT Pub. Date: Jun. 7, 2018

(65) Prior Publication Data
US 2020/0023557 A1  Jan. 23, 2020

(30) Foreign Application Priority Data
Dec. 1, 2016 (EP) .................................. 16201771

(51) Int. Cl.
B29C 33/00 (2006.01)
B29C 70/44 (2006.01)
(Continued)

(52) U.S. Cl.
CPC ........ B29C 33/0066 (2013.01); B29C 70/443 (2013.01); B29C 70/548 (2013.01); B29D 99/0003 (2013.01); B29L 2031/085 (2013.01)

(58) Field of Classification Search
CPC . B29C 70/548; B29C 70/443; B29C 33/0061; B29C 33/0077
See application file for complete search history.

(56) References Cited

U.S. PATENT DOCUMENTS 3,428,289 A * 2/1969 Heckrotte et al. .. B29C 33/0061
249/105
5,709,893 A   1/1998 McCarville et al.
(Continued)

FOREIGN PATENT DOCUMENTS

CN   101412285 A   4/2009
CN   105899353 A   8/2016
(Continued)

OTHER PUBLICATIONS

Richers et al., DE 10 2011 082 664 A1, Machine Translation, Mar. 14, 2013 (Year: 2013).*
(Continued)

*Primary Examiner* — Galen H Hauth
(74) *Attorney, Agent, or Firm* — Nath, Goldberg & Meyer; Jerald L. Meyer; Tanya E. Harkins (57) ABSTRACT

The present invention relates to a method and to a mould system (70) for manufacturing a shear web for a wind turbine blade as well as to a backing plate (66) for such method and mould system. The method involves arranging one or more fibre layers on top of a web mould part (61), arranging backing plates (66) at each end to create a mould cavity between the first and second backing plate (66, 68) and the web mould part (61). Each backing plate (66, 68) comprises an inner moulding surface (80), outer surfaces (98, 100) and a channel (82) or groove (83) extending (Continued)

between at least one of the outer surfaces (98, 100) and the inner moulding surface (80). Resin is supplied to the mould cavity via each channel or groove of the first and second backing plate (66, 68), and subsequently the resin is cured or hardened to form the shear web.

19 Claims, 5 Drawing Sheets

(51) Int. Cl.
    *B29C 70/54*    (2006.01)
    *B29D 99/00*    (2010.01)
    *B29L 31/08*    (2006.01)

(56) References Cited

U.S. PATENT DOCUMENTS

| | | | | |
|---|---|---|---|---|
| 5,721,034 | A * | 2/1998 | Seemann, III | B29C 33/0066 428/71 |
| 5,993,184 | A * | 11/1999 | Morrow | B29C 33/32 156/382 |
| 2007/0182071 | A1 * | 8/2007 | Sekido | B29C 33/0066 264/511 |
| 2008/0072527 | A1 * | 3/2008 | Kondo | B29C 66/72141 52/841 |
| 2010/0080952 | A1 * | 4/2010 | Suzuki | B29C 70/546 428/113 |
| 2012/0289109 | A1 * | 11/2012 | Gohier | B29C 33/10 442/59 |
| 2016/0279890 | A1 | 9/2016 | Jespersen et al. | |

FOREIGN PATENT DOCUMENTS

| | | | | |
|---|---|---|---|---|
| DE | 102011082664 A1 * | 3/2013 | | B29D 99/0003 |
| EP | 3090863 A1 | 11/2016 | | |
| WO | 2016066207 A1 | 5/2016 | | |
| WO | 2016066816 A1 | 5/2016 | | |
| WO | WO-2016066207 A1 * | 5/2016 | | B29C 70/443 |

OTHER PUBLICATIONS

International Search Report dated Feb. 26, 2018 issued in corresponding International Application No. PCT/EP2017/081178.
Chinese First Office Action and Search Report dated Sep. 29, 2020 corresponding to application No. 201780074559.0.
Indian First Examination Report dated Apr. 20, 2021 corresponding to application No. 201947024495.
Chinese Office Action and Search Report dated Jul. 5, 2021 corresponding to application No. 201780074559.0.

* cited by examiner

METHOD AND SYSTEM FOR MANUFACTURING A SHEAR WEB FOR A WIND TURBINE

This is a National Phase Application filed under 35 U.S.C. 371 as a national stage of PCT/EP2017/081178, filed Dec. 1, 2017, an application claiming the benefit of European Application No. 16201771.9, filed Dec. 1, 2016, the content of each of which is hereby incorporated by reference in its entirety.

FIELD OF THE INVENTION

The present invention relates to a method and to a mould system for manufacturing a shear web for a wind turbine blade as well as to a backing plate for such method and mould system.

BACKGROUND OF THE INVENTION

Wind turbine blades are often manufactured according to one of two constructional designs, namely a design where a thin aerodynamic shell is glued or otherwise bonded onto a spar beam, or a design where spar caps, also called main laminates, are integrated into the aerodynamic shell.

In the first design, the spar beam constitutes the load bearing structure of the blade. The spar beam as well as the aerodynamic shell or shell parts are manufactured separately. The aerodynamic shell is often manufactured as two shell parts, typically as a pressure side shell part and a suction side shell part. The two shell parts are glued or otherwise connected to the spar beam and are further glued to each other along a leading edge and trailing edge of the shell parts. This design has the advantage that the critical load carrying structure may be manufactured separately and therefore is easier to control. Further, this design allows for various different manufacturing methods for producing the beam, such as moulding and filament winding.

In the second design, the spar caps or main laminates are integrated into the shell and are moulded together with the aerodynamic shell. The main laminates typically comprise a high number of fibre layers compared to the remainder of the blade and may form a local thickening of the wind turbine shell, at least with respect to the number of fibre layers. Thus, the main laminate may form a fibre insertion in the blade. In this design, the main laminates constitute the load carrying structure. The blade shells are typically designed with a first main laminate integrated in the pressure side shell part and a second main laminate integrated in the suction side shell part. The first main laminate and the second main laminate are typically connected via one or more shear webs, which for instance may have a C-shaped or I-shaped cross-section. For very long blades, the blade shells may further along at least a part of the longitudinal extent comprise an additional first main laminate in the pressure side shell, and an additional second main laminate in the suction side shell. These additional main laminates may also be connected via one or more shear webs. This design has the advantage that it is easier to control the aerodynamic shape of the blade via the moulding of the blade shell part.

The shear webs act to reinforce the blade structure, and prevent excessive bending or buckling. Some blade designs use shear webs formed from beam members having I- or C-shaped cross-sections, the members having a main body with load-bearing flanges extending therefrom at opposed ends of the main body.

One method of manufacturing such I- or C-webs is through the provision of a sandwich panel body to which layers of fibre material are applied at the opposed ends in the shape of the desired flanges, the fibre material being infused with a resin and subsequently cured to form rigid flanges.

It is well-known to manufacture such shear webs in a suitably shaped mould structure, wherein a C-web can be manufactured using a relatively simple U-shaped mould, where the sandwich panel body extends between opposed walls of the mould structure, with the flanges formed through the layup of fibre material against the said walls.

Similarly, an I-web can be manufactured using a mould having a central support bounded by flexible support members on either side to define an adjustable void between the flexible support members and the opposed mould walls. In this situation, the sandwich panel body is arranged on the central support, while the adjustable void is arranged to receive fibre layers to form the flanges on a first side of the panel body, with the flanges on the second side of the panel body formed by the layup of fibre material against the opposed mould walls.

Such resin-infused fibre-based flanges are often the target for the prevention of structural faults and cracks, due to the relatively large forces transferred through said flanges. International Patent Application Publication No. WO 2016/066816 A1 discloses a method and mould system for manufacturing I-shaped shear webs for wind turbine blades. The mould system comprises a lower web mould part having a concave shape with diverging side parts for manufacturing first sides of I-web foot flanges, and an upper mould part having a concave shape with converging side parts for manufacturing other sides of the I-web foot flanges.

In such prior art systems, resin is typically infused into the mould cavity at, or close to, the centre of the web body. This has been observed by the present inventors to result in dissatisfying flow patterns and resulting structural properties throughout the shear web.

It is an object of the invention to provide an alternative system and method for the manufacture of shear webs, which provides for increased ease of manufacturing combined with a reduced risk of structural failure.

It is a further object of the present invention to provide a system and method for the manufacture of shear webs that is simple and cost-effective.

It is another object of the present invention to provide a system and method for the manufacture of shear webs that is flexible and applicable to a number of different moulding situations.

SUMMARY OF THE INVENTION

It has been found that one or more of the aforementioned objects can be obtained by a method of manufacturing a shear web for a wind turbine blade, the shear web having a web body and a first web foot flange at a first end of the web body and a second web foot flange at a second end of the web body, wherein the method comprises the steps of:

a) providing an elongated lower web mould part having a moulding surface with a central portion, which is substantially flat, a first downwardly extending moulding surface portion at a first end of the lower web mould part, and a second downwardly extending moulding surface portion at a second end of the lower web mould part, b) arranging one or more fibre layers on top of the elongated lower web mould part and at least partly covering the first downwardly extending moulding surface portion, the central portion, and the second downwardly extending moulding surface portion, c) arranging a first backing plate opposite to the first downwardly extending moulding surface portion and arranging a second backing plate opposite to the second downwardly extending moulding surface portion to create a mould cavity between the first and second backing plates and the lower web mould part, wherein each backing plate comprises an inner moulding surface, one or more outer surfaces, and a channel or groove extending between at least one of the outer surfaces and the inner moulding surface of the backing plate, d) supplying resin to the mould cavity via the respective channel or groove of the first and second backing plate, and e) curing or hardening the resin in order to form the shear web.

It has been surprisingly found that such resin infusion from the foot flange of the later shear web, unlike the common infusion at the web body, leads to improved flow patterns resulting in better structural stability and less repairs. Also, this results in a very cost-effective mould system and time-efficient process setup due to the flow channel or groove in the backing plates. The backing plates may be made of non-costly materials, such as one or more polymers, and may be reusable. In addition, they are compatible for manufacturing shear webs across different blade types. Preferably, the backing plates are reusable.

Typically, the outer surfaces of the backing plate include an opposing back surface that is substantially parallel to the inner moulding surface, and four lateral surfaces, such as a right, left, top and bottom lateral surface. Preferably, the channel or groove extends between one of more of the lateral surfaces and the inner moulding surface of the backing plate.

Advantageously, the lower web mould part has an overall concave shape with diverging side parts for manufacturing first sides of the web foot flanges. A set of first fibre layers may be draped over the concave moulding surface of the web part. The first fibre layers will ideally comply with the moulding surface of the lower mould.

Preferably, the lower web mould part comprises magnetic material, wherein the first and/or second backing plate further comprises a recess in its outer surface and wherein one or more magnets are arranged in the recess for retaining the backing plate against the lower web mould part during moulding. This solution has been found to result in extremely fast mounting of the backing plates and a very low risk for leaks. The entire system can be placed under a vacuum bag. The magnetic material of the lower web mould part may be steel or steel in combination with one or more other components. Thus, the lower web mould part may substantially consist of steel.

In a preferred embodiment, the recess of the backing plate is located in an opposing back surface that is substantially parallel to the inner moulding surface of the backing plate.

Preferably, the shear web is substantially I-shaped. By substantially I-shaped is meant that the shear web has a shear web body and a first web foot flange at a first end of the web body, where a first flange part extends from a first side of the web body and a second flange part extends from a second side of the web body, and further a second web foot flange at a second end of the web body, where a first flange part extends from a first side of the web body and a second flange part extends from a second side of the web body.

In a preferred embodiment, the outer surface of each backing plate comprises a lateral surface, wherein the channel leads from said lateral surface to the inner moulding surface of the backing plate. The lateral surface may, for example, be a left side surface or a right side surface of the backing plate.

In a particularly preferred embodiment, the outer surfaces of each backing plate comprise two opposing lateral surfaces, and wherein the groove is extending throughout the inner moulding surface between the two opposing lateral surfaces of the backing plate. The opposing lateral surfaces may for example be a right hand surface and an opposing left hand lateral surface of the backing plate. In such embodiments, the backing plate can be advantageously manufactured by an extrusion process.

According to another embodiment, the first downwardly extending moulding surface portion and/or the second downwardly extending moulding surface portion comprises a ledge which forms part of the moulding surface of the lower web mould part. The ledge may define an end section of the side of the web foot flange and/or may be used for supporting the external web foot flange.

In a preferred embodiment, the first and the second downwardly extending moulding surface portion of the lower web mould part are diverging from the central portion along at least a part of the elongated lower web mould part.

According to another embodiment, step b) further comprises arranging a core material, such as balsawood or foamed polymer, on top of the one or more fibre layers in the central part of the lower web mould part, optionally followed by arranging one or more fibre layers on top of the core material. Advantageously, the core material is of low density, such as balsawood, foamed polymer or the like. Thus, the web body of the shear web may be formed as a sandwich construction having a set of first fibre layers as a first skin, a core material in the middle, and a set of second fibre layers as a second skin.

Additionally, a set of third fibre layers may be provided for the first web foot flange, and a set of fourth fibre layers may be provided for the second web foot flange. The additional third and fourth fibre layers may form the bonding surfaces of the web foot flanges. An infusion mesh and/or peel ply may be applied on top of the third and/or fourth fibre layers prior to arranging the backing plates in their positions.

It is preferred that step c) further comprises retaining one or more of the fibre layers against the inner moulding surface of the first and/or the second backing plate. This may be achieved by retaining means, such as a tackifier, a clamp, or magnets. Alternatively, one or more of the fibre layers may be wrapped around a top part of the backing plates According to another embodiment, step b) further comprises arranging an upper web mould part on top of the fibre layers, the upper web mould part having a moulding surface with a central portion, which is substantially flat, a first upwardly extending moulding surface portion at a first end of the upper web mould part, and a second upwardly extending moulding surface portion at a second end of the upper web mould part, and wherein step b) optionally comprises wrapping ends of the second fibre layers against the first and the second upwardly extending moulding surface of the upper web mould part.

In a preferred embodiment, the first and the second upwardly extending moulding surface portion of the upper web mould part are converging from the central portion along at least a part of the elongated upper web mould part.

According to an advantageous embodiment, the angle of the first downwardly extending moulding surface portion is substantially equal to the angle of the first upwardly extending surface portion. Thereby, the two web mould parts allow a substantially straight first web foot flange to be formed.

Preferably, the angle of the second downwardly extending moulding surface portion is substantially equal to the angle of the second upwardly extending surface portion, whereby a substantially straight second web foot flange may be formed.

The width of the central part of the upper web mould part preferably corresponds to the width of the central part of the lower web mould part. The width of the upper web mould part may also be slightly less that the width of the lower web mould part in order to accommodate for the converging web foot flanges.

A set of second fibre layers may be draped to the side flanges of the upper web mould part by first arranging the second fibre layers so that they are draped on top of the first fibre layers and optional core material parts. After the upper web mould part has been arranged on top of the second fibre layers, the ends of the second fibre layers may simply be wrapped against the side flanges of the upper web mould part.

According to another embodiment, the mould cavity is further sealed by at least one vacuum bag. The vacuum bag may be placed at least on top of the array of fibre layers and optional core material that has been arranged on the lower web mould part. In such embodiments, the mould cavity is delimited by the backing plates, the lower web mould part and the vacuum bag. In another embodiment, the vacuum bag may be placed over at least part of the outer back surface of the backing plates.

Typically, the mould cavity prior to supplying the resin is evacuated by use of a vacuum source. Thus, it is seen that the shear web may be manufactured via a Vacuum Assisted Resin Transfer Moulding (VARTM) process. In principle, it is also possible to use RTM, where resin is injected into the mould cavity by use of an over-pressure. The resin is preferably injected into the mould cavity, e.g. by drawing the resin in via the vacuum or under-pressure. However, it is in principle also possible to use prepreg material for some of the fibre layers.

Usually, after step e) the backing plates, and optionally the upper web mould part, are removed from the shear web, and the shear web in a following step is removed from the lower web mould part. This may simply be done by lifting the wind turbine component from the lower web mould part, which can easily be done, since the side parts of the lower mould are diverging from the central part of the mould part. The lower mould part is advantageously coated with a release agent so that the wind turbine component easily may be lifted from the surface of the lower web mould part.

According to an advantageous embodiment, at least a first insert is arranged at the first end of the lower web part, wherein said first insert is adapted to provide a gradual transition from the web body to the first web foot flange and/or a second insert is arranged at the first end of the lower web part, wherein said first insert is adapted to provide a gradual transition from the web body to another part of the first web foot flange, the first insert and/or the second insert being e.g. substantially wedge shaped.

The first insert and/or the second insert may advantageously be substantially wedge shaped. Thus, the insert may have an overall triangular appearance. In an advantageous embodiment, the inserts have a rounded outer surface, which the first fibre layers and the second fibre layers, respectively, may abut so that a round transition is obtained from the web body to the first web foot flange. In principle, the transition may also be obtained by a single insert. The shear web will preferably have similar inserts at the transition between the web body and the second web foot flange. The insert(s) may be made of a core material, such as balsawood or foamed polymer. It may also be made of a fibre-reinforced polymer material and may be a pultruded or extruded element.

The first fibre layers and second fibre layers are preferably glass fibres. They may also include carbon fibres, aramid fibres, hemp fibres or the like.

According to another embodiment, one or more of the fibre layers are cut along lower surfaces of the downwardly extending moulding surface portions or, optionally, along upper surfaces of the upwardly extending moulding surface portions. A set of first fibre layers may simply be draped over the lower web mould part and then cut to the correct width by using a cutter, such as a sonic knife, along the edges of the lower mould part.

In another aspect, the present invention relates to a mould system for manufacturing a shear web for a wind turbine blade, the shear web having a web body and a first web foot flange at a first end of the web body and a second web foot flange at a second end of the web body, wherein the system comprises:

an elongated lower web mould part having a moulding surface with a central portion, which is substantially flat, a first downwardly extending moulding surface portion at a first end of the lower web mould part, and a second downwardly extending moulding surface portion at a second end of the lower web mould part, two backing plates each comprising an inner moulding surface, one or more outer surfaces and a channel or groove extending between at least one of the outer surfaces and the inner moulding surface for supplying resin through the channel or groove into a mould cavity.

In a preferred embodiment, the lower web mould part comprises magnetic material, and wherein the first and/or second backing plate further comprises a recess in its outer surface and wherein one or more magnets are arranged in the recess for retaining the backing plate against the lower web mould part during moulding.

According to another embodiment, the recess of the backing plate is located in an opposing back surface that is substantially parallel to the inner moulding surface of the backing plate.

In a preferred embodiment, the outer surface of each backing plate comprises a lateral surface, wherein the channel leads from said lateral surface to the inner moulding surface of the backing plate.

In another embodiment, the outer surfaces of each backing plate comprise two opposing lateral surfaces, and wherein the groove is extending throughout the inner moulding surface between the two opposing lateral surfaces of the backing plate.

Advantageously, the first downwardly extending moulding surface portion and/or the second downwardly extending moulding surface portion comprises a ledge which forms part of the moulding surface of the lower web mould part.

According to another embodiment, the first and the second moulding surface portion are diverging from the central portion along at least a part of the elongated lower web mould part.

According to another embodiment, the mould system further comprises an elongated upper web mould part having a moulding surface with a central portion, which is substantially flat, a first upwardly extending moulding surface portion at a first end of the upper web mould part, and a second upwardly extending moulding surface portion at a second end of the upper web mould part.

According to another embodiment, the first and the second moulding surface portions of the elongated upper web mould part are converging from the central portion along at least a part of the elongated upper web mould part.

In a preferred embodiment, the angle of the first downwardly extending moulding surface portion is substantially equal to the angle of the first upwardly extending surface portion and/or the angle of the second downwardly extending moulding surface portion is substantially equal to the angle of the second upwardly extending surface portion.

Preferably, the first downwardly extending surface portion has an end portion, which corresponds to an end portion of the first web foot flange, and wherein the second downwardly extending surface portion has an end portion, which corresponds to an end portion of the second web foot flange.

It is also preferred that the first upwardly extending surface portion has an end portion, which corresponds to an end portion of the first web foot flange, and wherein the second upwardly extending surface portion has an end portion, which corresponds to an end portion of the second web foot flange.

In a preferred embodiment, the lower web mould part and/or the upper web mould part are made of a foamed polymer covered by a hard surface coating, which provides the moulding surface. According to one embodiment, the hard surface coating is made from a polyurea material.

According to another embodiment, the lower web mould part is modular having a central mould part with a raised central part, which comprises a first side wall and a second side wall, wherein
 a first mould insert is arranged at the first side wall of the raised central part so as to form the first downwardly extending moulding surface portion of the lower web mould part, and/or
 a second mould insert is arranged at the second side wall of the raised central part so as to form the first downwardly extending moulding surface portion of the lower web mould part.

In a preferred embodiment, the upper web mould part is modular and comprises a first upper web mould part for forming the first upwardly extending moulding surface portion and a second upper web mould part for forming the second upwardly extending moulding surface portion.

The mould system may be sectionised, in particular in the longitudinal or spanwise direction of the mould system. Thus, one section may manufacture a first longitudinal section of the shear web (or spar beam) and another section may manufacture a second longitudinal section of the shear web. The sectionised mould system may preferably be assembled so that the shear web may be manufactured as a unitary structure.

According to another aspect, the present invention relates to a backing plate for manufacturing a shear web for a wind turbine blade, the backing plate comprising an inner moulding surface, one or more outer surfaces and a channel or groove extending between at least one of the outer surfaces and the inner moulding surface for supplying resin through the channel or groove into a mould cavity.

In a preferred embodiment, the backing plate further comprises a recess in its outer surface, wherein one or more magnets are arrangeable in the recess for retaining the backing plate against a lower web mould containing magnetic material.

According to another embodiment, the recess of the backing plate is located in an opposing back surface that is substantially parallel to the inner moulding surface of the backing plate.

In a preferred embodiment, the outer surface of each backing plate comprises a lateral surface, and wherein the channel leads from said lateral surface to the inner moulding surface of the backing plate. In a particularly preferred embodiment, the outer surfaces of the backing plate comprise two opposing lateral surfaces, and wherein the groove is extending throughout the inner moulding surface between the two opposing lateral surfaces of the backing plate. As discussed above, such backing plate can advantageously be manufactured using an extrusion process.

The channel or groove may have a width in the range between 10 and 50 mm, advantageously between, 15 and 45 mm, more advantageously between 20 and 40 mm. Further, the channel or groove has a height in the range between 5 and 25 mm, advantageously between, 5 and 20 mm, more advantageously between 8 and 16 mm. Additionally, the channel or groove has a cross-sectional area in the range between 50 and 500 mm$^2$, advantageously between, 100 and 400 mm$^2$, more advantageously between 150 and 350 mm$^2$.

In another aspect, the present invention relates to a method of manufacturing a shear web for a wind turbine blade, the shear web having a web body and a first web foot flange at a first end of the web body and a second web foot flange at a second end of the web body, wherein the method comprises infusing resin into a mould cavity such that the resin flows from a region forming the first and second web foot flange towards a region forming the web body of the shear web. The present invention also relates to a shear web obtainable by said process.

In another aspect, the present invention relates to a method of manufacturing at least a part of a wind turbine blade comprising manufacturing at least one shear web as described above, and joining said at least one shear web to a second component to form at least a part of a wind turbine blade.

There is further provided a shear web manufactured according to the above-described method. There is further provided a wind turbine blade comprising a shear web as described above. There is further provided a wind turbine comprising at least one wind turbine blade as described above.

As used herein, the term "outer surface(s)" of a backing plate refers to any surface that does not form part of the inner moulding surface of the backing plate, i.e. any surface that is external to the mould cavity. Such outer surface(s) may include an opposing back surface that is substantially parallel to the inner moulding surface or lateral surfaces of the backing plate. The lateral surfaces of the backing plate typically include four lateral surfaces, i.e. including a right and a left side surface and a top and bottom side surface.

As used herein, the term "magnetic material" refers to materials that are attracted to a magnet, such as ferromagnetic materials.

DESCRIPTION OF THE INVENTION

The invention is explained in detail below with reference to an embodiment shown in the drawings, in which.

DETAILED DESCRIPTION

Figure 1:
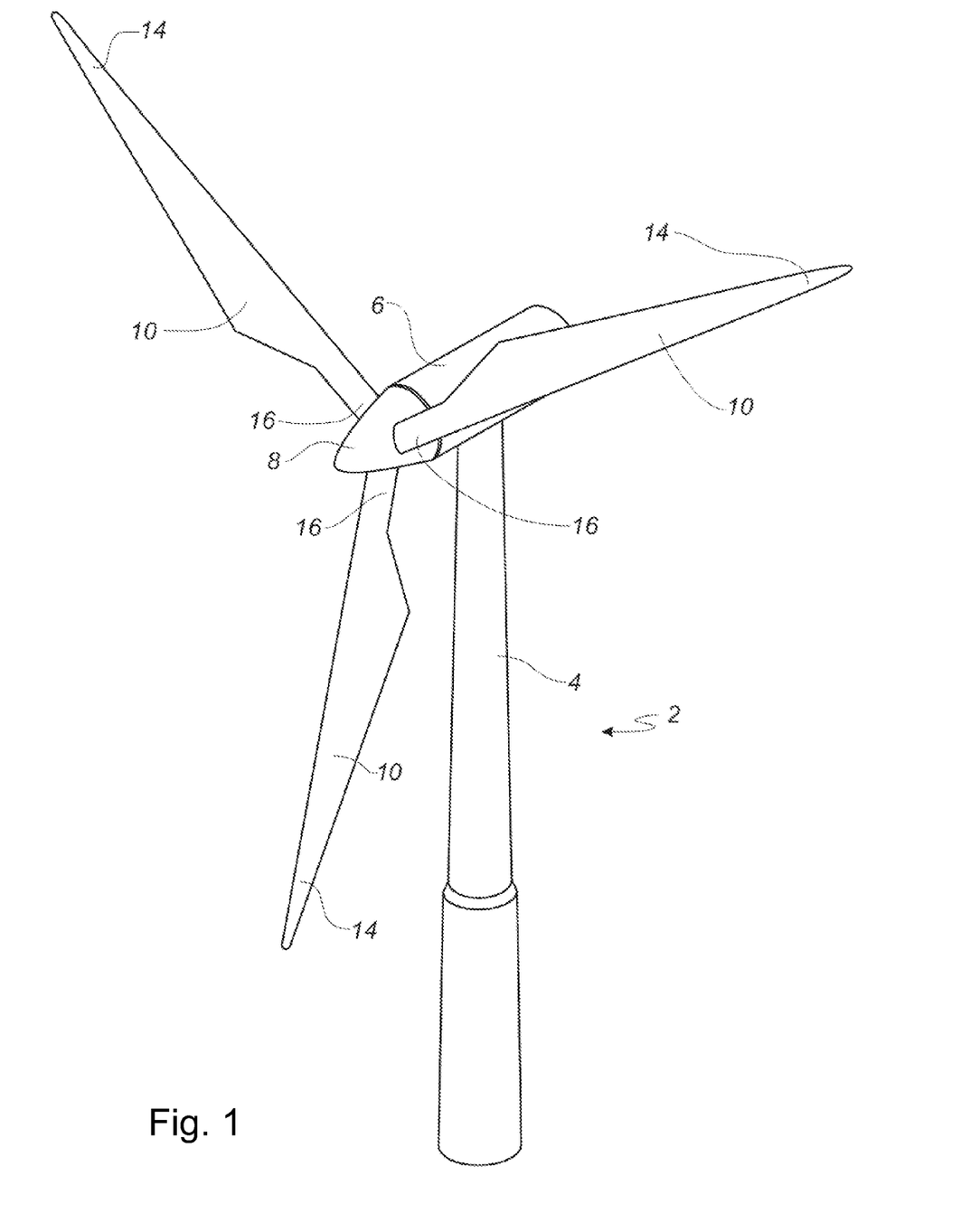
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
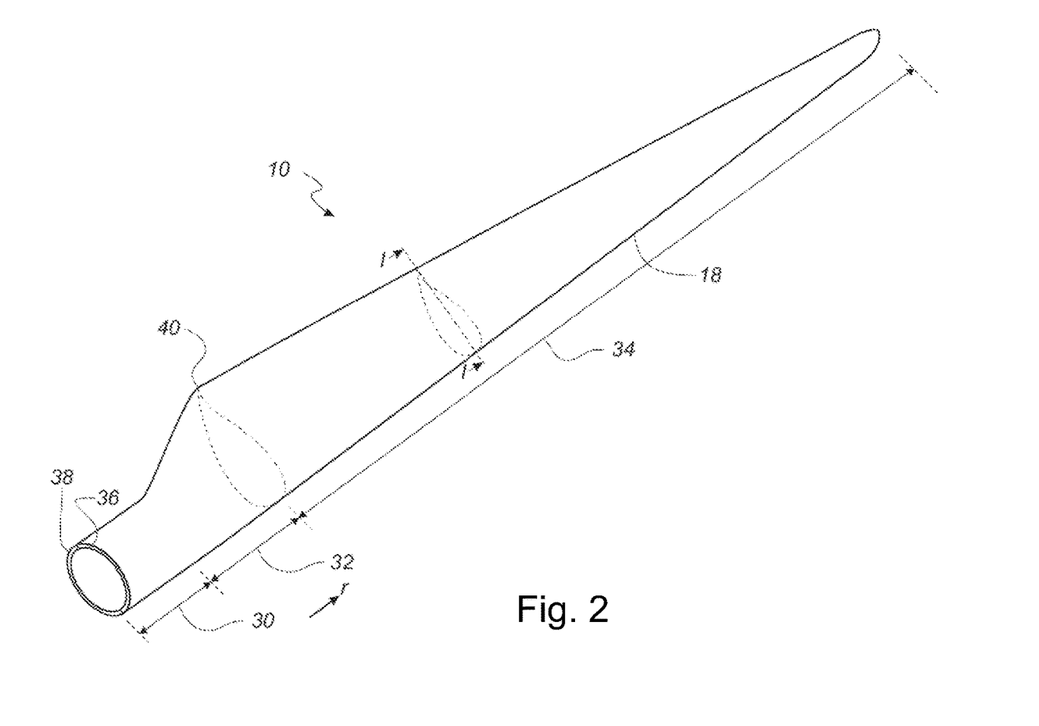
FIG. 2 shows a schematic view of a wind turbine blade.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

Figure 3:
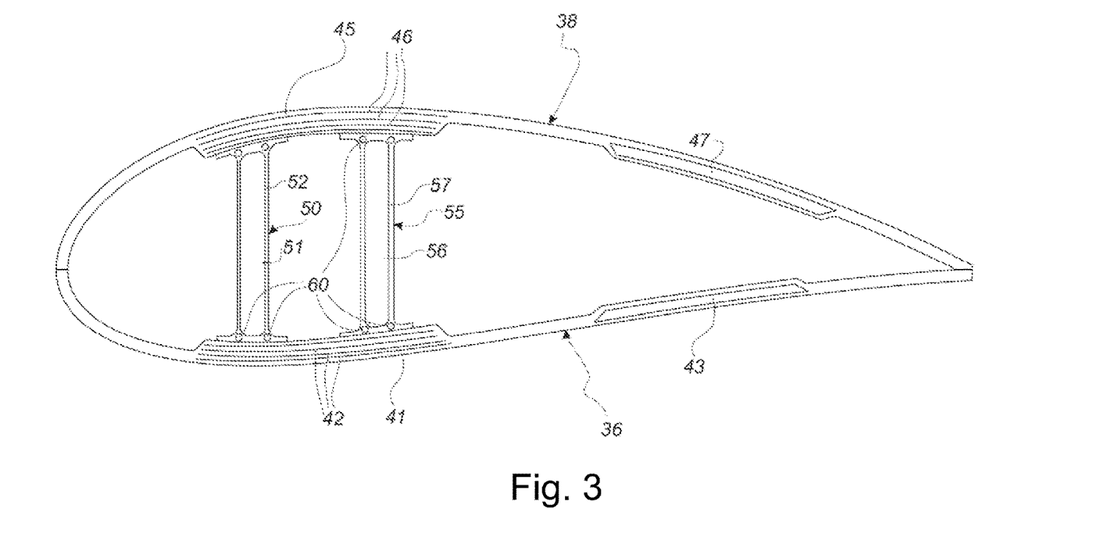
FIG. 3 shows a schematic view of a cross-section of a wind turbine blade.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The second shear web 55 has a similar design with a shear web body and two web foot flanges, the shear web body comprising a sandwich core material 56 covered by a number of skin layers 57 made of a number of fibre layers. The sandwich core material 51, 56 of the two shear webs 50, 55 may be chamfered near the flanges in order to transfer loads from the webs 50, 55 to the main laminates 41, 45 without the risk of failure and fractures in the joints between the shear web body and web foot flange. However, such a design will normally lead to resin rich areas in the joint areas between the legs and the flanges. Further, such resin rich area may comprise burned resin due to high exothermic peeks during the curing process of the resin, which in turn may lead to mechanical weak points.

In order to compensate for this, a number of filler ropes 60 comprising glass fibres are normally arranged at these joint areas. Further, such ropes 60 will also facilitate transferring loads from the skin layers of the shear web body to the flanges. However, according to the invention, alternative constructional designs are possible.

The blade shells 36, 38 may comprise further fibre-reinforcement at the leading edge and the trailing edge. Typically, the shell parts 36, 38 are bonded to each other via glue flanges in which additional filler ropes may be used (not shown). Additionally, very long blades may comprise sectional parts with additional spar caps, which are connected via one or more additional shear webs.

Figure 4:
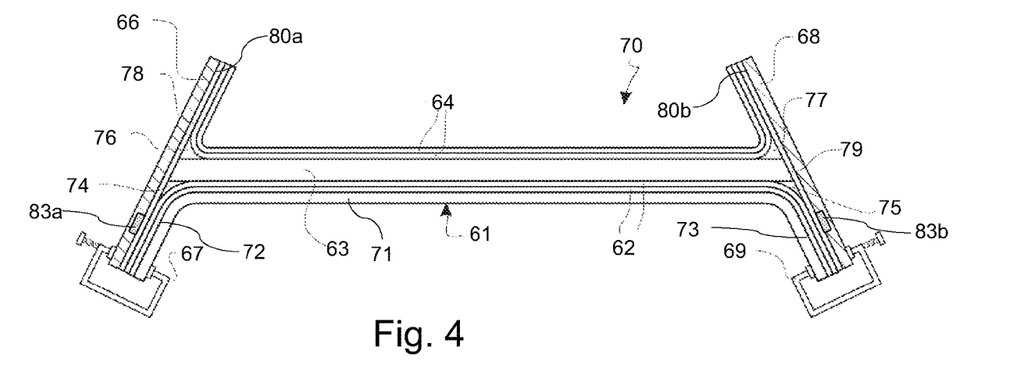
FIG. 4 shows a schematic view of a cross-section of a shear web mould system according to the present invention.

FIG. 4 illustrates a method of manufacturing a shear web for a wind turbine blade according to the present invention. The shear web mould system 70 of FIG. 4 comprises a lower mould part 61 and a first backing plate 66 for forming an outer surface of a first web foot flange of the shear web, and a second backing plate 68 for forming an outer surface of a second web foot flange of the shear web. The lower web mould part 61 has a moulding surface, which defines an outer part of a shear web manufactured via the shear web moulding system. The moulding surface comprises a central portion 71, which is substantially flat, and which is utilised to form a web body of the shear web. Further, the lower web mould part 61 comprises a first side part at a first side end of the lower web mould part 61, the first side part having a first downwardly extending moulding surface portion 72. Similarly, the lower web mould part 61 comprises a second side part at a second side end, the second side part having a second downwardly extending moulding surface portion 73. The first and the second moulding surface portions 72, 73 are diverging from the central portion 71 along at least a part of the elongated lower web mould part 61.

The process according to the present invention may involve arranging a number of first fibre layers 62 on top of the lower web mould part 61 and covering the downwardly extending moulding surface portions 72, 73 of the lower web mould part 61. The first fibre layers 62 form part of an outer skin of the finished shear web. A core material 63, such as balsawood or foamed polymer, is arranged on top of the first fibre layers 62 in the central portion 71 of the lower web mould part 61. Thus, the web body of the shear web may be formed as a sandwich construction having the first fibre layers 62 as a first skin and second fibre layers 64 as a second skin. Further, a first insert 74 may be arranged at the first side end of the lower web mould part 61 and at a first side of the core material 63. The first insert 74 may have a shape so as to provide a gradual transition from the web body to a first web foot flange. Similarly, a second insert 75 may be arranged at the second side end of the lower web mould part 61 and at the first side of the core material 63. The second insert 75 may have a shape so as to provide a gradual transition from the web body to a second web foot flange.

A number of second fibre layers 64 are arranged on top of the core material 63. Further, a third insert 76 may be arranged at the first side end of the lower web mould part 61 and at a second side of the core material 63. The third insert 76 may have a shape so as to provide a gradual transition from the web body to a first web foot flange. Similarly, a fourth insert 77 may be arranged at the second side end of the lower web part 61 and at the second side of the core material 63. The fourth insert 77 may have a shape so as to provide a gradual transition from the web body to a second web foot flange. Additionally, a number of third fibre layers 78 may be provided for the first web foot flange, and a number of fourth fibre layers 79 may be provided for the second web foot flange. The additional fibre layers 78, 79 may form the bonding surfaces of the web foot flanges. An infusion mesh and/or peel ply may be applied on top of the third and/or fourth fibre layers prior to arranging the backing plates in their positions, or they may replace the third and/or fourth fibre layers.

Once the first fibre reinforcement layers 62 making up the first skin of the shear web body and the first sides of the web foot flanges, and optionally the core material and/or any inserts, are arranged on top of the lower web mould part 61, the first backing plate 66 is clamped against the first fibre layers 62 and the first downwardly extending moulding surface portion 72 of the lower web mould part 61 by use of a first clamp 67. Similarly, the second backing plate 68 is clamped against the first fibre layers 64 and the second downwardly extending moulding surface portion of the lower web mould part 61 by use of a second clamp 69. Each backing plate 66, 68 comprises a respective inner moulding surface 80a, 80b and a groove 83a, 83b extending throughout the moulding surface between two opposing lateral surfaces (best seen in FIG. 9).

The second fibre layers 64 making up the second skin of the shear web body and the second sides of the web foot flanges may be wrapped around a top part of the backing plates 66, 68, or they may be retained against the moulding surfaces of the two backing plates by retaining means, such as a tackifier, a clamp, or magnets.

Once the fibre material 62, 64, 78, 79, core material 63, and possible inserts 74, 75, 76, 77 have been arranged, a vacuum foil (not shown) is arranged on top of the material and the shear web mould system 70, and in a next step, not shown, a vacuum source is connected to the mould cavity, and the mould cavity is evacuated by use of the vacuum source. The mould cavity is further connected to a resin source, and liquid resin is injected into the mould cavity so as to wet the fibre material and the core material. The resin is supplied to the mould cavity between the backing plates 66, 68 and the lower mould part 61 via each of the grooves 83a, 83b of the first and second backing plates 66, 68. Subsequently, the resin is cured or hardened to form the shear web.

Figure 5:
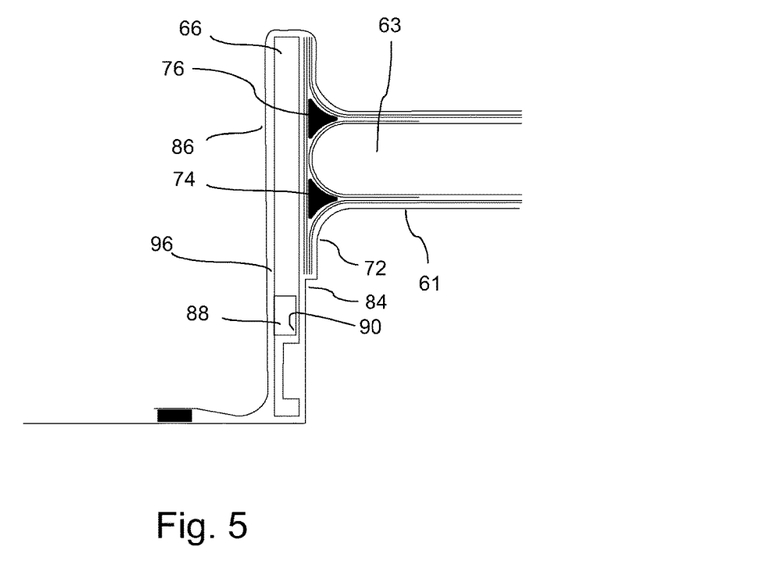
FIG. 5 shows a schematic view of a cross-section of another embodiment of a shear web mould system according to the present invention.

FIG. 5 illustrates another embodiment of a mould system of the present invention (only one end shown in cross sectional view). Here, the lower mould part 61 comprises a ledge 84 within the downwardly extending moulding surface portion 72. The ledge 84 may define an end section of the side of the web foot flange and/or may be used for carrying the external web foot flange. In such a setup, it might not be necessary to use clamps. The backing plate 66 further comprises a recess 90 wherein a magnet 88 is arranged in the recess for retaining the backing plate 66 in its position during moulding. In such embodiments it is preferred that the lower mould part 61 comprises steel or substantially consists of steel. A vacuum bag 86 is placed on top of the array of fibre layers and core material on the lower web mould part and over the back surface 96 of the backing plate 66.

Figure 6:
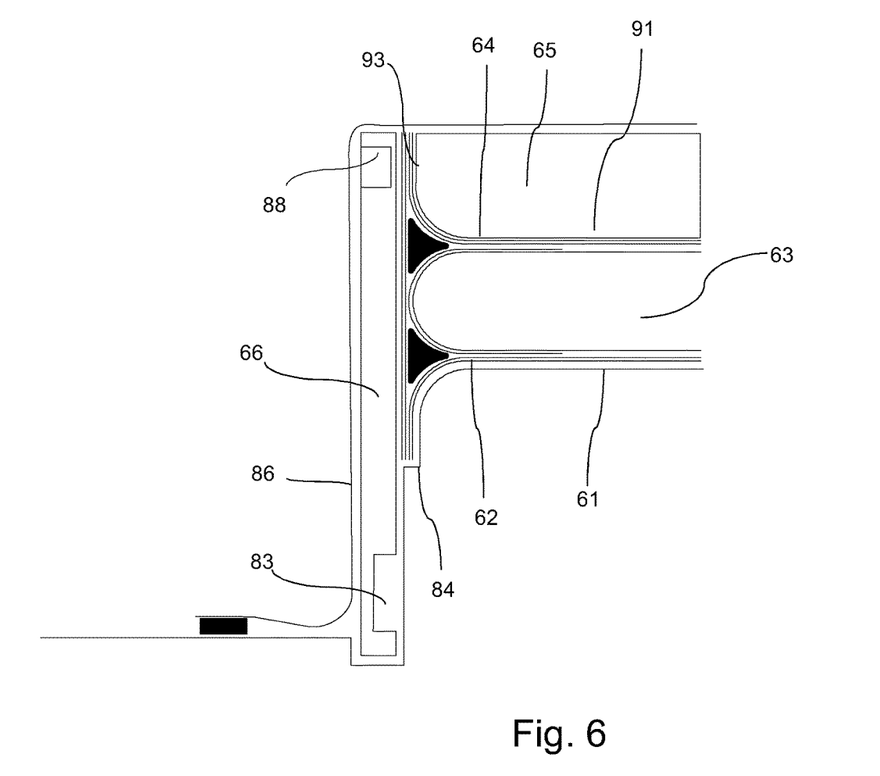
FIG. 6 shows a schematic view of a cross-section of another embodiment of a shear web mould system according to the present invention.

An alternative embodiment of a mould system of the present invention is illustrated in FIG. 6 (only one end shown in cross sectional view). The web mould system of FIG. 6 comprises both a lower web mould part 61 and an upper web mould part 65. The web mould parts may for instance comprise a core part made of a foamed polymer, which is covered by a hard surface coating, e.g. a polyurea material. The upper web mould part 65 comprises a moulding surface with a central portion 91, which is substantially flat, a first upwardly extending moulding surface portion 93 at a first end of the upper web mould part 65, and a second upwardly extending moulding surface portion at a second end of the upper web mould part (not shown).

The fibre material 62, 64 and core material 63 forming part of the finished shear web is arranged between the lower web mould part 61 and the upper web mould part 65. The lower web mould part 61 is provided with a ledge 84, for defining an end section of the first side of the web foot flange and/or may be used for carrying the external web foot flange. As in the previously described embodiment, the backing plate 66 contains a groove 83 extending between opposing outer lateral surfaces. A vacuum bag 86 is arranged on top of the two web mould parts 61, 65 and the backing plate 66. Resin is then injected through the groove 83 and finally hardened or cured in order to form the final shear web.

The reinforcement fibre material described for the various embodiments is preferably glass fibres. However, it could also be other suitable fibre reinforcement material, such as carbon fibres. While the various embodiments have been shown for shear webs having a rounded transition from the web body to the web foot flange, it is also recognized that an angled configuration between the two parts may be utilised instead.

Figure 7:
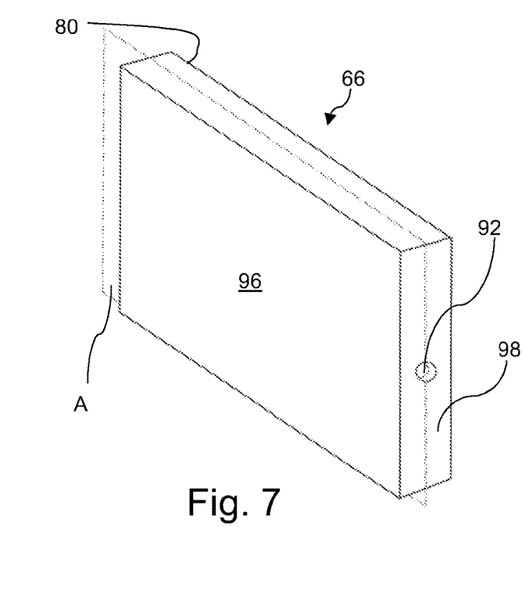
FIG. 7 shows a perspective view of a backing plate according to the present invention.
Figure 8:
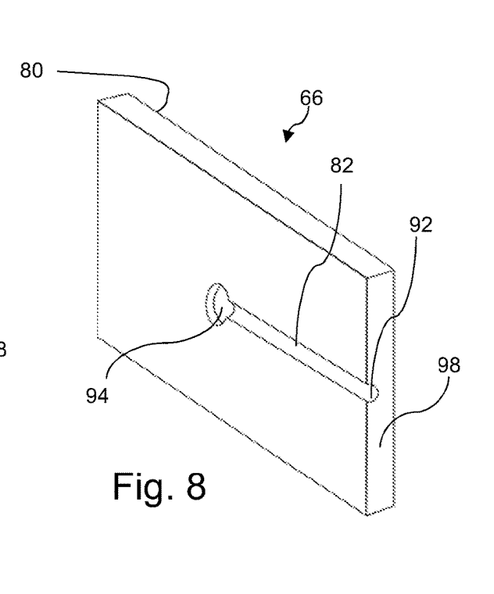
FIG. 8 shows a partially cut-away perspective view of a backing plate according to the present invention.

FIGS. 7 and 8 further illustrate some details of a backing plate 66 according to one embodiment of the present invention, wherein FIG. 8 is a cut-away perspective view of the backing plate 66 cut open along the plane A in FIG. 7. The backing plate 66 comprises a moulding surface 80 which faces the mould cavity during moulding of the shear web according to the present invention. It also comprises an opposing outer back surface 96 that is substantially parallel to the inner moulding surface and facing away from the mould cavity during operation. Also, the backing plate comprises a lateral surface 98 containing an opening 92. As can be seen in FIG. 8, the opening 92 is part of an integrated channel 82 leading to an opening 94 in the moulding surface 80 of the backing plate. Thus, during operation, resin flows through the opening 92, through the channel 82, through the opening 94 and finally into the mould cavity to mould the shear web.

Figure 9:
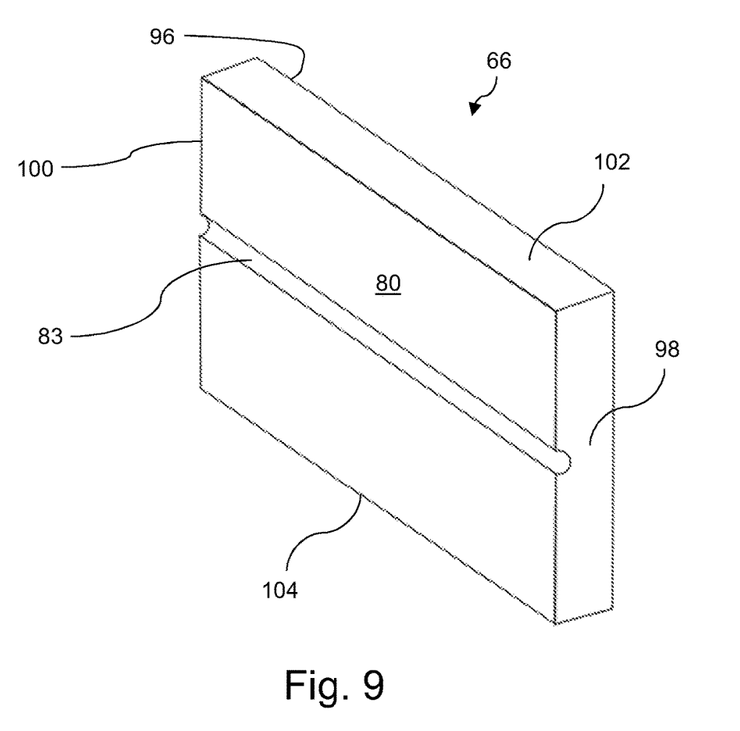
FIG. 9 shows a perspective view of a backing plate according to another embodiment of the present invention.

FIG. 9 shows a perspective view of a backing plate 66 according to another embodiment of the present invention. The backing plate 66 comprises a moulding surface 80 which faces the mould cavity during moulding of the shear web according to the present invention. It also comprises an opposing back surface 96 that is substantially parallel to the inner moulding surface 80 and facing away from the mould cavity during operation. The backing plate 66 of FIG. 9 comprises a first lateral surface 98 and an opposing second lateral surface 100. It further comprises a third lateral surface 102 and an opposing fourth lateral surface 104. A groove 83 is extending across the moulding surface 80 between the two opposing lateral surfaces 98, 100. In this way, resin can be supplied to the mould cavity via the groove 83 from one or both lateral surfaces of the backing plate. This could be done, for example, by inserting a pipe or hose into the opening in one or both of the lateral surfaces 98, 100.

The invention has been described with reference to advantageous embodiments. However, the scope of the invention is not limited to the illustrated embodiments, and alterations and modifications can be carried out without deviating from the scope of the invention, which is defined by the claims.

Figure 10:
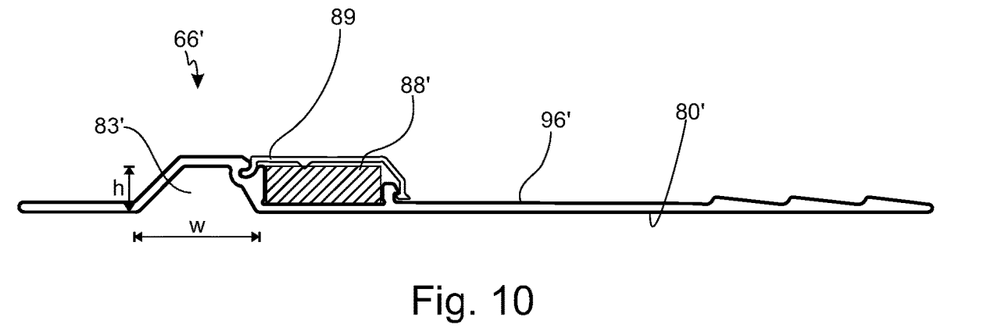
FIG. 10 shows a perspective view of a backing plate according to yet another embodiment of the present invention.

FIG. 10 shows a side view of a backing plate 66' according to yet another embodiment of the present invention. The backing plate 66' comprises a moulding surface 80' which faces the mould cavity during moulding of the shear web according to the present invention. It also comprises an opposing back surface 96' that is substantially parallel to the inner moulding surface 80' and facing away from the mould cavity during operation. A groove 83' is extending across the moulding surface 80' between two transverse sides of the backing plate 66'. In this way, resin can be supplied to the mould cavity via the groove 83' from one or both lateral surfaces of the backing plate in a similar way to that described in relation to FIG. 9. As shown in this embodiment, a recess may be formed in one of the surfaces of the backing plate, e.g. as shown in the back surface 96'. A magnet 88' may be inserted in the recess, which may be closed or locked in place by use of a closure 89 or lid.

A height h of the groove 83, 83' may for instance be between 5 mm and 20 mm, e.g. around 12 mm. The width w of the groove 83, 83' may be between 15 mm and 55 mm, e.g. around 31 mm or 32 mm. The area of the groove may be between 100 mm² and 500 mm², e.g. around 250 mm².

The invention has been described with reference to advantageous embodiments. However, the scope of the invention is not limited to the illustrated embodiments, and alterations and modifications can be carried out without deviating from the scope of the invention, which is defined by the claims.

LIST OF REFERENCE NUMERALS 4 tower
6 nacelle
8 hub
10 blades
14 blade tip
16 blade root
18 leading edge
20 trailing edge
30 root region
32 transition region
34 airfoil region
36 pressure side shell part
38 suction side shell part
40 shoulder
41 spar cap
42 fibre layers
43 sandwich core material
45 spar cap
46 fibre layers
47 sandwich core material
50 first shear web
51 sandwich core material of shear web
52 skin layers
55 second shear web
56 sandwich core material of second shear web
57 skin layers of second shear web
60 filler ropes
61 lower mould part
62 first fibre layers
63 core material
64 second fibre layers
65 upper mould part
66, 66' first backing plate
67 first clamp
68 second backing plate
69 second clamp
70 web mould system
71 central portion
72 first downwardly extending moulding surface portion
73 second downwardly extending moulding surface portion
74 first insert
75 second insert
76 third insert
77 fourth insert
78 third fibre layers
79 fourth fibre layers
80, 80' inner moulding surface of backing plate
82 channel
83, 83' groove
84 ledge
86 vacuum foil
88, 88' magnet
89 closure
90 recess
91 central portion of moulding surface of upper web mould part
92 opening in side surface
93 upwardly extending moulding surface portion of upper web mould part
94 opening in inner moulding surface
96, 96' back surface of backing plate
98 first lateral surface of backing plate
100 second lateral surface of backing plate
102 third lateral surface of backing plate
104 fourth lateral surface of backing plate
R rotor radius
r distance from hub

The invention claimed is:

1. A method of manufacturing a shear web (50) for a wind turbine blade, the shear web having a web body and a first web foot flange at a first end of the web body and a second web foot flange at a second end of the web body, wherein the method comprises the steps of:
- a) providing an elongated lower web mould part (61) having a moulding surface with a central portion (71), which is substantially flat, a first downwardly extending moulding surface portion (72) at a first end of the lower web mould part (61), and a second downwardly extending moulding surface portion (73) at a second end of the lower web mould part (61);
- b) arranging one or more fibre layers (62, 64) on top of the elongated lower web mould part (61) and at least partly covering the first downwardly extending moulding surface portion (72), the central portion (71), and the second downwardly extending moulding surface portion (73);
- c) arranging a first backing plate (66) opposite to the first downwardly extending moulding surface portion (72) and arranging a second backing plate (68) opposite to the second downwardly extending moulding surface portion (73) to create a mould cavity between the first and second backing plates (66, 68) and the lower web mould part (61), wherein each of the first and second backing plates comprises an inner moulding surface (80), one or more outer surfaces (98, 100), and a groove (83) extending between at least one of the outer surfaces (98, 100) and the inner moulding surface (80) of the respective one of the first and second backing plates, wherein the one or more outer surfaces of each of the first and second backing plates comprise opposing first and second lateral surfaces, and wherein the groove (83) of each of the first and second backing plates extends through the inner moulding surface (80) between the opposing first and second lateral surfaces of the corresponding one of the first and second backing plates, the groove (83) extending from the first lateral surface to the second lateral surface;
- d) supplying resin to the mould cavity via the respective groove (83) of the first and second backing plates (66, 68); and
- e) curing or hardening the resin in order to form the shear web.

2. The method according to claim 1, wherein the lower web mould part (61) comprises magnetic material, and wherein the first and/or second backing plate (66, 68) further comprises a recess (90) in its outer surface and wherein one or more magnets (88) are arranged in the recess (90) for retaining the backing plate against the lower web mould part (61) during moulding.

3. The method according to claim 2, wherein the recess (90) of the backing plate is located in an opposing back surface (96) that is substantially parallel to the inner moulding surface of the backing plate.

4. The method according to claim 1, wherein the shear web is I-shaped.

5. The method according to claim 1, wherein the first downwardly extending moulding surface portion (72) and/or the second downwardly extending moulding surface portion (73) comprises a ledge (84) which forms part of the moulding surface of the lower web mould part (61).

6. The method according to claim 1, wherein the first and the second downwardly extending moulding surface portion (73) of the lower web mould part (61) are diverging from the central portion (71) along at least a part of the elongated lower web mould part (61).

7. The method according to claim 1, wherein step b) further comprises arranging a core material (63) on top of the one or more fibre layers in the central part of the lower web mould part (61), optionally followed by arranging one or more fibre layers on top of the core material (63).

8. The method according to claim 1, wherein step c) further comprises retaining one or more of the fibre layers against the inner moulding surface (80) of the first and/or the second backing plate (66, 68).

9. The method according to claim 1, wherein step b) further comprises arranging an upper web mould part on top of the fibre layers, the upper web mould part having a moulding surface with a central portion (91), which is substantially flat, a first upwardly extending moulding surface portion at a first end of the upper web mould part, and a second upwardly extending moulding surface portion at a second end of the upper web mould part, and wherein step b) optionally comprises wrapping ends of the second fibre layers against the first and the second upwardly extending moulding surface of the upper web mould part.

10. The method according to claim 9, wherein the first and the second upwardly extending moulding surface portion of the upper web mould part are converging from the central portion (91) along at least a part of the elongated upper web mould part.

11. The method according claim 1, wherein the mould cavity is further sealed by at least one vacuum bag.

12. The method according to claim 1, wherein at least a first insert is arranged at the first end of the lower web mould part, wherein said first insert is adapted to provide a gradual transition from the web body to the first web foot flange and/or a second insert is arranged at the first end of the lower web part, wherein said first insert is adapted to provide a gradual transition from the web body to another part of the first web foot flange.

13. A mould system (70) for manufacturing a shear web for a wind turbine blade, the shear web having a web body and a first web foot flange at a first end of the web body and a second web foot flange at a second end of the web body, wherein the system comprises:
- an elongated lower web mould part (61) having a moulding surface with a central portion (71), which is substantially flat, a first downwardly extending moulding surface portion (72) at a first end of the lower web mould part (61), and a second downwardly extending moulding surface portion (73) at a second end of the lower web mould part (61), and
- first and second backing plates (66, 68), wherein each of the first and second backing plates comprises an inner moulding surface (80), one or more outer surfaces (98, 100), and a groove (83) extending between at least one of the outer surfaces (98, 100) and the inner moulding surface (80) of the respective one of the first and second backing plates, wherein the one or more outer surfaces of each of the first and second backing plates comprise opposing first and second lateral surfaces, and wherein the groove (83) of each of the first and second backing plates extends through the inner moulding surface (80) between the opposing first and second lateral surfaces of the corresponding one of the first and second backing plates, the groove (83) extending from the first lateral surface to the second lateral surface.

14. The mould system according to claim 13, wherein the lower web mould part (61) comprises magnetic material, and wherein the first and/or second backing plate (66, 68) further comprises a recess (90) in its outer surface and wherein one or more magnets are arranged in the recess (90) for retaining the backing plate against the lower web mould part (61) during moulding.

15. The mould system according to claim 14, wherein the recess (90) of the backing plate is located in an opposing back surface (96) that is substantially parallel to the inner moulding surface of the backing plate.

16. The mould system according to claim 13, wherein the outer surfaces of each backing plate comprise two opposing lateral surfaces (98, 100), and wherein the groove (83) is extending throughout the inner moulding surface (80) between the two opposing lateral surfaces (98, 100) of the backing plate.

17. The mould system according to claim 13, wherein the first downwardly extending moulding surface portion (72) and/or the second downwardly extending moulding surface portion (73) comprises a ledge (84) which forms part of the moulding surface of the lower web mould part (61).

18. The method according to claim 7, wherein the core material (63) comprises balsawood or a foamed polymer.

19. The method according to claim 12, wherein at least one of the first insert and the second insert is substantially wedge shaped.

* * * * *